United States Patent [19]
Macken

[11] 4,430,548
[45] Feb. 7, 1984

[54] LASER APPARATUS AND PROCESS FOR CUTTING PAPER

[76] Inventor: John A. Macken, P.O. Box 696, Santa Rosa, Calif. 95402

[21] Appl. No.: 371,535

[22] Filed: Apr. 26, 1982

[51] Int. Cl.³ .............................................. B23K 9/00
[52] U.S. Cl. ...................... 219/121 LG; 219/121 LP; 219/121 LQ; 219/121 LR; 219/121 LW
[58] Field of Search ...... 219/121 LG, 121 L, 121 LJ, 219/121 LM, 121 LP, 121 LW, 121 LQ, 121 LR, 121 LY, 121 LU, 121 LN; 346/76 L, 108; 350/165, 171, 172

[56] References Cited

U.S. PATENT DOCUMENTS

| | | | |
|---|---|---|---|
| 3,549,733 | 12/1970 | Caddell | 219/121 LP X |
| 4,128,752 | 12/1978 | Gravel | 219/121 LP X |
| 4,156,124 | 5/1979 | Macken et al. | 219/121 LP X |
| 4,219,721 | 8/1980 | Kamen et al. | 219/121 LP X |

OTHER PUBLICATIONS

M. A. Grimm, *IBM Technical Disclosure Bulletin*, "Optical System for Laser Machining of Narrow Slots", vol. 14, No. 9, Feb. 1972, pp. 2641–2642.

*Primary Examiner*—C. L. Albritton
*Attorney, Agent, or Firm*—Edward E. Roberts

[57] ABSTRACT

A non-contact laser engraving apparatus and process for producing laser paper cuts, the apparatus including optics for scanning the laser beam through a condensing optical system having its focus point at the position of a metal mask template, the non-reflected rays passing on to an optical device at a point where all rays of the scanning laser beam are superimposed and there is no apparent movement, the focal length of the optical device being selected so that the template configuration is reimaged on the paper on the other side of the optical device. The optical devices and components may be lenses or mirrors. The process and apparatus is usable with moving paper by motion of the template and paper at the same time at a speed proportional to the ratio of distance between the paper and optical device, and the distance between the optical device and template.

15 Claims, 2 Drawing Figures

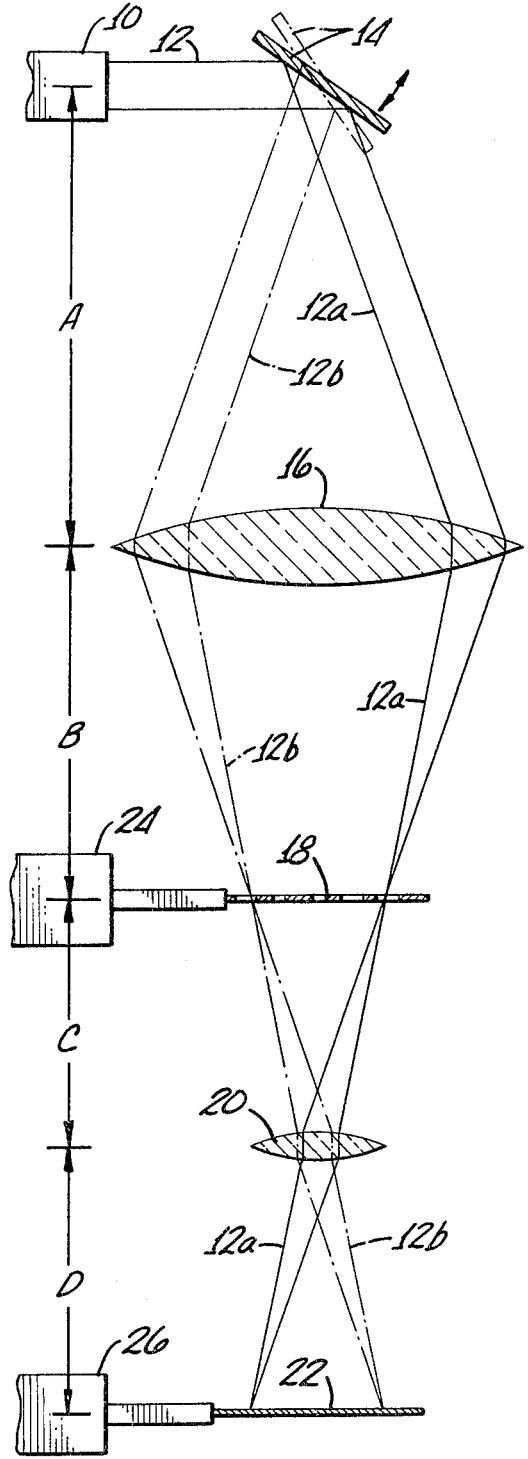
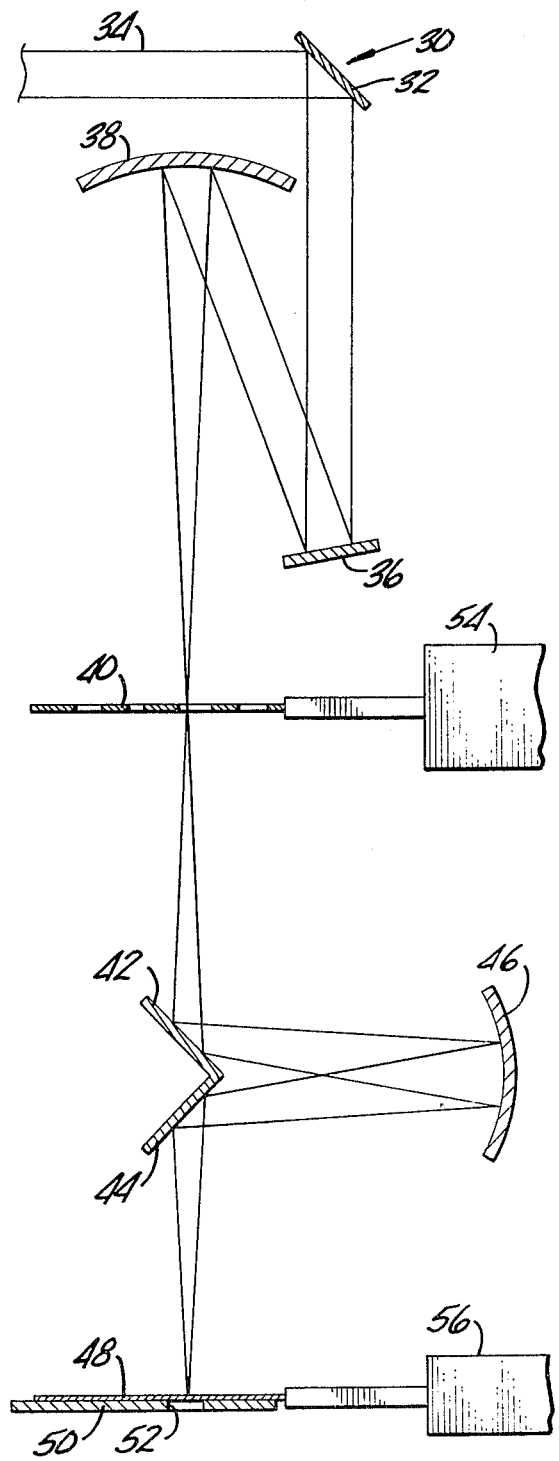

LASER APPARATUS AND PROCESS FOR CUTTING PAPER

BACKGROUND OF THE INVENTION

The background of the invention will be discussed in two parts:

1. Field of the Invention

This invention relates to laser apparatus and processes and more particularly to a laser apparatus and process for producing laser cuts in paper.

2. Description of the Prior Art

The use of laser apparatus to produce intricate paper cuts has recently experienced great commercial success. The process and apparatus presently in use, however, utilizes a template which makes contact with a stack of paper, with the apparatus designed to exert considerable pressure on the paper to prevent smoke from condensing between the various sheets of paper. With this pressure requirement, the particular process and apparatus does not readily lend itself to use in a line with a standard printing press which is set up to handle one sheet of paper at a time with a continuous flow of paper.

Another method utilized for producing laser cut paper involves a modulation approach, in which the paper is scanned with an electronically modulated laser beam with the beam being turned on and off to provide a point by point resolution of the desired image. This approach, however, has been heretofore utilized with stationary, or very slow-moving paper, since present modulation mechanisms for use with carbon dioxide lasers do not permit a high enough modulation frequency to be achieved for the mass production required in the printing industry. Furthermore, apparatus involving direct modulation of the laser beam is complicated and expensive.

Non-contact laser-engraving apparatus has heretofore been successfully been utilized for engraving objects made of wood. One such apparatus is shown and described in U.S. Pat. No. 4,156,124, entitled "Image Transfer Laser Engraving". In the device of this patent, first and second generally parallel support tables are mounted for simultaneous synchronous rotation, with a mask or template on the first table and the work piece on the second table therebeneath. A laser positioned above the first table provides a laser beam passing through the mask to the work piece, with movement of the laser following a radially inward path as the tables rotate. The masks or templates for use in this apparatus have varying configurations. However, while the apparatus of this patent may be used with paper objects or work pieces, the nature of the apparatus does not lend itself to use with the requirements of the printing industry.

It is an object of the present invention to provide a new and improved laser apparatus and process for use in laser cutting of paper.

It is another object of the present invention to provide a new and improved laser apparatus and process for use in laser cutting of moving paper.

SUMMARY OF THE INVENTION

The foregoing and other objects of the invention are accomplished by providing a source of laser energy for directing a laser beam at a scanning mechanism. The so-scanned beam is directed at a first optical means which converges the light and brings the laser beams to a focus in a plane in space, with a template positioned within this plane, so that the scanning laser beam is always focused when it strikes the template. Interposed between the template and the paper work piece is a second optical means, the focal length of which is selected so that the position thereof reimages the template pattern on the sheet or work piece. The first and second optical means are lenses or mirrors. In either configuration, the template and workpiece are moved simultaneously in parallel planes in optimum direction and speed while the scanning may take any convenient form, such as an overlapping raster scan in a direction perpendicular to the direction of movement of the template.

Other objects, features and advantages of the invention will become apparent from a reading of the specification, when taken in conjunction with the drawings, in which, like reference numerals refer to like elements in the several views.

BRIEF DESCRIPTION OF THE DRAWINGS

FIG. 1 is a diagrammatic side view of a laser apparatus according to the invention utilizing lenses as the optical devices; and FIG. 2 is a diagrammatic side view of the laser apparatus according to the invention using mirrors as the optical devices.

DESCRIPTION OF THE PREFERRED EMBODIMENT

In the apparatus and process to be hereinafter described, a mask or template is utilized, the template having openings in those areas where laser beam passage is desired for recreating the image on a work piece, such as paper or the like. Certain mask, or template configurations are shown and described in the aforementioned U.S. Pat. No. 4,156,124, and reference thereto may be had for template construction, the exact construction not forming a part of the present invention. With specific application to the paper or printing industry, there is no disadvantage in utilizing templates. Current cutting of paper requires stencils for the artwork. The mechanical requirements for interconnection of lines in the template are no different than the mechanical requirements for producing the artwork for the paper, which must also be stencilled.

Additionally, as will hereinafter be described, the apparatus and process in accordance with the present invention, lends itself quite readily to use in the printing industry where the paper is moving. Referring now to the drawings, and particularly to FIG. 1, there is shown a laser apparatus, which includes a laser 10, which is stationary, and which may preferably be a carbon dioxide laser, the laser 10 directing a laser beam 12 (depicted as two lines for discussion relative to the finite width of the beam) toward a scanning mechanism 14. In the diagram of FIG. 1, the scanning mechanism is depicted as a scanning mirror which is adapted for rapidly moving back and forth through a given angle about an axis perpendicular to the plane of the drawing. From the scanning mechanism 14 there are shown two pairs of lines bearing reference designations 12a and 12b, each of these pairs of lines depicting the path of the laser beam 12 at different extremes of pivoting of the scanning mirror or mechanism 14. For example, the pair of solid lines 12a depict the beam 12 reflected from the surface of the mirror with the scanning mechanism 14 in the solid line position, while the pair of dotted lines 12b depict the laser beam 12 reflection from the surface of the mirror with the scanning mechanism 14 in the dotted line position.

A lens 16 is positioned to intercept all paths of the laser beam 12 reflected from the mirror through the various scan positions, with the lens positioned a distance "A" from the mechanism 14, with the center of the lens on an axis extending through the pivot axis of the scanning mechanism 14, with the lens 16 in a plane perpendicular to the centermost scan position of the laser beam 12. The laser beam 12 strikes the lens 16 at various points through the scan cycle, with lens 16 refracting the intercepted beam to a focus in a plane in space. At this point in space, the focused laser beam, is reduced to a point of a finite width or diameter. This plane in space is the location of the mask or template 18, which is at a distance "B" from the lens 16. The template 18 is positioned in this plane, so that the scanning laser beam is always focused when it strikes the template 18.

The template 18 can be a metal mask which reflects the beam in the areas where the template 18 has been struck, while permitting the passage therethrough of laser beams in the openings thereof. The laser beams passing through the openings in the template 18 are directed to a second optical device, in the form of a lens 20 which is positioned at a distance "C" from the template 18, this position corresponding to a position where all rays of the scanning laser beam are superimposed, and there is no apparent movement.

The lens 20 is chosen to have a focal length so that the image of the template 18 is reimaged on the work piece, or sheet of paper 22. In this apparatus, light which passes through the openings of the template 18 will be brought to a focus again on the sheet of paper 22, which is positioned at a distance "D" from the lens 20. With a sufficiently high-powered laser, the paper 22 will be vaporized in the areas contacted by the laser beam.

With the apparatus as shown, all of the scanned laser light passes through the center of lens 20, thereby minimizing aberrations and producing high quality resolution of the image formed or cut into the paper 22. In the embodiment illustrated in FIG. 1, with the work piece or paper stationary, and with the template 18 stationary, there are certain mathematical relationships which apply. In addition to the distances "A"-"D" previously defined, if we designate the focal length of lens 16 as $F_{16}$; the focal length of lens 20 as $F_{20}$; the maximum length of the line scanned on lens 16 as $L_{16}$; the maximum length of the line scanned on template 18 as $L_{18}$; the maximum length of the line cut on paper 22 as $L_{22}$; then with the laser beam 12 parallel, the following mathematical relationships define the positions of the parts in the apparatus above described:

$$B = F_{16}$$

$$\frac{1}{F_{16}} = \frac{1}{A} + \frac{1}{B+C}$$

$$\frac{1}{F_{20}} = \frac{1}{C} + \frac{1}{D}$$

With the parts positioned in accordance with the above equations, then the maximum size of the scanned line (or areas) on the template 18 and the paper 22 are given by the following equations:

$$L_{18} = \frac{L_{16} B}{A}$$

$$L_{22} = \frac{L_{18} D}{C}$$

If beam 12 is not parallel, but either slightly converging or diverging when it strikes lens 16, then the above mathematical relationships still hold, except that $B \neq F_{16}$. This equation needs to be changed to:

$$\frac{1}{B} = \frac{1}{F_{16}} + \frac{1}{F_{12}}$$

Where $F_{12}$ = the distance from the point where the beam strikes lens 16 to the projected focus (real or imaginary) for beam 12, ignoring the effect of lens 16.

From this equation it can be seen that the effect of using convergent laser light is to decrease the distance B.

In the simplest of numerical examples, if lens 20 is chosen to have one-half ($\frac{1}{2}$) of the focal length of lens 16, and beam 12 is parallel, then the following dimensions can be put on the system of FIG. 1: $A = 2F_{16}$; $B = F_{16}$; $C = F_{16}$; and $D = F_{16}$.

Within these dimensions of the system, the maximum scanned line length on template 18 equals one-half ($\frac{1}{2}$) the diameter of 16 and the scanned line on paper 22 equals one-half ($\frac{1}{2}$) the diameter of lens 16. For optimizing the system, the diameter of lens 20 should be larger than the geometric projection of the ray bundle diameter at the selected position of lens 20. This is because rays of light passing through the template 18, near the edges of the opening therein, will diffract the light or beam at angles wider than the geometric ray bundle. With the lens diameter larger, this diffracted light will be captured to achieve good resolution on the paper 22. The diameter of lens 20, from a practical standpoint, should be approximately one-tenth (1/10) the distance "D", if the laser beam 12 is to be generated by a carbon dioxide laser with an output of 10.6 micron wavelength.

The description thus far has proceeded with reference to the beam 12 scanning a line and producing a line image on the paper 22, with the scanning mechanism scanning between the solid and dotted lines adjacent the mirror 14 position. In two-dimensional cutting, the scanning mechanism 14 makes a raster scan with two-dimensional motions. The scan-rate requirements for both the fast and slow scan rates of the raster scan depend on a number of factors, such as the size of the template 18 or lens 16 (whichever limits the aperture), the diameter of the focus spot on template 18, the power of the laser beam 12, and the thickness of the work piece, or paper 22. The primary objective is to achieve an overlapping scan on template 18 at a power density sufficient to vaporize cleanly the paper 22 in the open areas of the template 18.

Using the distances of the parts (and focal lengths) assumed previously, for a two-dimensional representation, or image, on the paper 22, the maximum size of image obtainable would be contained within a circle having a diameter of approximately one-half ($\frac{1}{2}$) the diameter of lens 16. This size of image pre-supposes that the template 18 and the paper 22 remain stationary while the cutting or laser-engraving is taking place.

However, with printing technology and apparatus set up for handling moving paper, it is more desirable to translate the template 18 and the paper 22 in opposite directions so that the image can be formed by scanning mirror 14 of the scanning mechanism in one plane, and achieving the two-dimensional image through the movement of template 18 and paper 22. For this purpose, there is shown in FIG. 1, blocks 24 and 26, respectively coupled to the template 18 and paper 22, respectively, for moving the template 18 and work piece or paper 22 simultaneously, in opposite directions. The scanning mechanism 14 will be scanning in a direction perpendicular to this simultaneous movement.

If the distance "C" in FIG. 1 equals the distance "D", then the speed of translation of template 18 should be equal to the speed of translation of paper 22 (but in opposite directions). If distances "C" and "D" are not equal, then it is necessary to adjust the speed of the template 18 and paper 22 proportional to the ratio of C/D to achieve tracking of the image. It is also possible to provide mechanism to move the template 18 and paper 22 in the same direction by using a three-lens combination in lieu of lens 20. However, this is not desirable since the additional lenses would add cost, while degrading the resolution of the image on the paper 22. In addition to the advantage of permitting cutting or engraving on moving paper 22, the utilization of the translating means 24 and 26 to move the paper 22 and template 18, provides an additional advantage that the size of the artwork is not restricted by the physical parameters of lens 16 in the direction in which the paper 22 is to be moved.

The description hereinabove has proceeded with reference to lenses as the optical devices. However, for use in the printing and paper industries, large working distances are required. With large working distances, large diameter lenses would be needed for the laser considered optimum for cutting paper, this being a carbon dioxide laser with an output of 10.6 micron wavelength. Lenses which can work at this wavelength are large diameter, which are expensive. Therefore, from a practical standpoint, it is desirable to provide a system which uses mirrors, which are less expensive, and readily made for use with the 10.6 micron wavelength of the laser. Referring now to FIG. 2, there is shown a laser apparatus using the same principles heretofore described, but utilizing mirrors as the optical devices rather than the lenses 16 and 18.

While it is well known to those skilled in the art that mirrors may be substituted for lenses, systems using mirrors rather than lenses are more complicated since it is necessary, in image formation, in a mirror system, to fold the beams back on themselves in reflection. In the system of FIG. 2, a scanning mechanism 30 has a scanning mirror 32 rapidly deflecting a laser beam 34 through an angle which is perpendicular to the plane of the drawing. This was constructed using a carbon dioxide laser, the diameter of the laser beam was approximately one-half (½) inch, and the laser beam was scanned through an angle of fifteen degrees (15°) at a rate of 60 cycles per second. The laser beam 34 then struck mirror 36, which is a flat rectangular mirror, having dimensions of approximately one inch wide by four and a quarter inches long in the plane perpendicular to the drawing. The beam 34 then proceeds on to a curved mirror 38, which is a mirror of about eight inches diameter with a focal length of fifteen inches. This eight-inch mirror has been cut in half so that mirror 38 is actually a semi-circle with the flat-cut edge nearest the scanning mechanism 30. The mirror 38 is oriented so that the 15° scan angle of the laser beam produces a line on the mirror 38 which is near the cut edge and all of the scanned laser beam 34 is captured by the mirror 38. In this embodiment, the mirror 38 is equivalent to the lens 16 (of FIG. 1) and the scanning mechanism 30 is equivalent to the scanning mechanism 14. As a further correlation of the two embodiments, the distance "A" discussed with reference to FIG. 1 is represented by the optical path length from mirror 30 to mirror 36 combined with the path length from mirror 36 to mirror 38. This optical path length has a combined length of twenty-eight inches in the apparatus of FIG. 2.

The scanning laser beam 34 is reflected from the surface of mirror 38 which directs it at a template 40, with the path length between mirror 38 and template 40 being fifteen inches. With these dimensions and physical parameters of the parts of the system, the dimension of the line scanned on the template is 3.88 inches in a direction perpendicular to the plane of the drawing. As discussed previously, in connection with the system of FIG. 1, the template 40, in the embodiment of FIG. 2 is positioned in a plane at the focal point of the laser beam. This plane is the same as the focal plane of mirror 38 if the laser beam is parallel. Laser light passing through the openings of the template 40 are intercepted by a second optical device, consisting of two flat mirrors 42 and 44, and a hemispherical mirror 46. The flat mirrors 42 and 44 are positioned at an angle to each other with adjacent edges of the two mirrors in abutting relation, the mirrored surface of mirror 42 directing the intercepted laser beam 34 at an approximate right angle toward the hemispherical mirror 46 which then reflects the beam back toward the mirrored surface of the second flat mirror 44, which re-directs the beam downward toward the work piece or paper 48. The apparatus is provided with a metal sheet 50 for supporting the paper 48, with the sheet 50 having an aperture or gap 52 in general alignment with the area of the paper 48 to be scanned to permit the escape of any smoke with emerges from the backside of the paper 48 during operation. In the system of FIG. 2, both mirrors 42 and 44 are flat mirrors having approximate dimensions of one inch by four and a quarter inches, with the spherical mirror 46 being a four and a quarter inch mirror with a focal length of 8.65 inches. The combined optical path from template 40 to mirror 42 to curved mirror 46 is 17.3 inches, with the same optical path from the curved mirror 46 to the paper 48 via flat mirror 44.

Mirrors 42 and 44 cooperate to provide another function besides merely folding the beams, inasmuch as these two flat mirrors cooperate to provide a geometric image inversion so that template 40 and paper 48 are translated in the same direction rather than in opposite directions such as required in the system described in FIG. 1.

In the apparatus of FIG. 2, a template translating device 54 is connected to move the template 40, while paper moving means 56 are provided to move paper 48 during operation, the relative speeds of movement of the two being suitably controlled by any convenient method. In a typical use, by way of example, a 200-watt carbon dioxide laser was employed with a focus spot size of approximately 0.030 inches. With reference to the drawing of FIG. 2, the template 40 is transported to the right by the device 54 at a speed of approximately 0.20 inch per second with the paper being moved in the same direction by the mechanism 56 at the same speed.

The paper 48 is approximately 0.004 inches thick. With the physical parameters of distances, sizes and focal lengths of the mirrors above described, the speeds were selected to provide an integrated laser energy density at the surface of the paper 48 of approximately 250 watt-seconds/in.$^2$", which is the amount of energy required to vaporize through paper of this thickness. With the 15° scan angle of the scanning mirror 30, the width of the cut line on the paper is 3.88 inches with the 200 watt laser beam determining the translation speeds, that is, the speed of movement of the template 40 and paper 48. The use of a spherical mirror 46 provides a minimum of aberration, since the spherical optical system is being used relatively close to its theoretically perfect imaging position, that is to say, that a sphere exhibits no spherical aberration when a point located at the center of curvature of the sphere is imaged back on itself. In the embodiment of FIG. 2, the images appearing on flat mirrors 42 and 44 are located at a distance equal to the radius of curvature of the spherical mirror 46, with the images on the flat mirrors 42 and 44 being separated by a few degrees. Still, the resolution of this portion of the optical system is quite good.

In addition, it should be pointed out that this optical system produces images better than what would be presumed by diffraction-limit calculations which presume uniform illumination of the entire aperature of mirror 46 in FIG. 2 or lens 20 in FIG. 1. In this design, the laser beam is small compared to the diameter of mirror 46 in FIG. 2 and the laser beam always hits near the center of mirror 46. This design always assures that all of the information contained in a certain number of diffraction rings (depends on "F" number) is completely captured by mirror 46 and completely transferred to paper 48. This is preferable to uniform illumination of mirror 46 because with uniform illumination (or a widely scanning beam), a sizable percentage of the light falls near the edge of the mirror and portions of even low-order diffraction rings are lost.

This has been supported by observations using 10.6 micron light wherein better resolution was obtained with an F18 system than would have been expected with uniform illumination.

The system above has been described, by way of illustration, and not of limitation with respect to certain physical parameters based on the laser power, the work piece requirements and the like to provide typical speeds of movement of the template 40 and paper 48. Obviously, however, the use of a more powerful laser with the same thickness paper 48 would permit higher speeds of movement of the paper 48 with the same laser energy density at the surface. Other obvious modifications may likewise be made depending on the material being cut or engraved, such as plastic film or even cloth, knowing the amount of energy required for vaporization. The apparatus hereinabove described may also conveniently be used with thicker materials such as wood or leather, which may be selectively surface etched or engraved, rather than cut all the way through. However, the apparatus and method herein described, particularly with the components of the embodiment of FIG. 2, provide an economical and speedy way of laser cutting of paper for the paper industry where the paper is moving.

While there have been shown and described preferred embodiments, it is to be understood that various other adaptations and modifications may be made within the skill of the art for use with particular applications, without departing from the spirit and scope of the invention.

I claim:

1. In a laser apparatus, the combination comprising: laser means for providing a laser beam;
   scanning means for directing said laser beam along a predetermined path;
   first optical means for intercepting the so-called laser beam and for directing it to a point where the undiffracted rays of the scanned laser beam are superimposed;
   template means at or near the plane of the focus of said laser beam, said template means having means therein for passage therethrough of a portion of the so-scanned laser beam for creating an image;
   second optical means for intercepting the so-scanned laser beam passing through said template means, said second optical means being positioned at or near the point where all undiffracted rays of the so-scanned laser beam passing therethrough are superimposed; and
   a work-piece positioned at the focal plane of said second optical means for imaging the scanned laser energy passing through said template means, this imaged laser energy being of sufficient power density to vaporize a portion of said workpiece thereby reproducing the image of said template means thereon.

2. The combination according to claim 1 wherein said first and second optical means are lenses.

3. The combination according to claim 1 wherein said first and second optical means are mirror means.

4. The combination according to claim 1 further including means for moving said template means.

5. The combination according to claim 4 further including means for moving said work piece in the direction required to track the optical image of said template means.

6. The combination according to claim 1 wherein said scanning means directs said laser beam along a line through a predetermined angle and said apparatus further includes means for moving said template means in a direction perpendicular to said line, and means for moving said work piece in the direction required to track the optical image of said template means.

7. The combination according to claim 6 wherein said first and second optical means are lenses.

8. The combination according to claim 6 wherein said first and second optical means are mirror means.

9. The combination according to claim 8 wherein said first optical means includes a flat mirror for receiving the so-scanned laser beam for directing it to a second curved mirror.

10. The combination according to claim 9 wherein said second optical means includes third, fourth and fifth mirrors, said third mirror being a flat mirror for reflecting the intercepted beam at an angle to said fourth mirror which is a spherical mirror for redirecting the beam back in the same general direction from which it came to said fifth mirror which is a flat mirror for re-directing the beam toward said work piece.

11. The combination according to claim 10 wherein said third and fifth mirrors are in edgewise abutting relation.

12. The combination according to claim 1 wherein said scanning means includes a scanning mirror for directing said laser beam along a line through a predetermined angle, and said apparatus further includes means for simultaneously moving said template means and said work piece in a direction along a line perpendicular to the scan line.

13. The combination according to claim 12 wherein the movements of said template means and said work piece are at speeds and in directions for providing an overlapping raster scan at the work piece surface for re-creating the image of said template means.

14. The combination according to claim 13 wherein said means for moving moves said template means and said work piece in opposite directions at proportional speeds.

15. The combination according to claim 13 wherein said means for moving moves said template means and said work-piece in the same direction at proportional speeds.

* * * * *

UNITED STATES PATENT AND TRADEMARK OFFICE
CERTIFICATE OF CORRECTION

PATENT NO. : 4,430,548
DATED : February 7, 1984
INVENTOR(S) : John A. Macken

It is certified that error appears in the above-identified patent and that said Letters Patent is hereby corrected as shown below:

Column 8, line 8, "so called" should read -- so-scanned --.

Signed and Sealed this

Twenty-ninth Day of May 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,430,548

DATED : February 7, 1984

INVENTOR(S) : John Alan Macken

It is certified that error appears in the above-identified patent and that said Letters Patent is hereby corrected as shown below:

Column 8, line 22, "focal" should read -- image --.

Signed and Sealed this

Twenty-second Day of July 1986

[SEAL]

Attest:

DONALD J. QUIGG

*Attesting Officer*  *Commissioner of Patents and Trademarks*